US005725320A

United States Patent [19]

Austin et al.

[11] Patent Number: 5,725,320

[45] Date of Patent: Mar. 10, 1998

[54] LINERLESS MEDIA AND CUTTING APPARATUS FOR MINIMIZING ADHESIVE PROBLEMS WHEN CUTTING THE MEDIA

[75] Inventors: Pixie Ann Austin, Marysville; Allen Crowe, Kirkland, both of Wash.

[73] Assignee: Intermec Corporation, Everett, Wash.

[21] Appl. No.: 435,022

[22] Filed: May 4, 1995

[51] Int. Cl.$^6$ .............................. B41J 13/10; B32B 3/00

[52] U.S. Cl. .............................. 400/642; 400/621; 156/384; 428/201; 428/343

[58] Field of Search .............................. 101/288; 400/621, 400/642; 156/250, 272.2, 272.4, 273.3, 273.5, 277, 353, 354, 379.6, 380.7, 380.9, 384, 387, 510; 428/201, 343, 346, 348, 349, 350, 351

[56] References Cited

U.S. PATENT DOCUMENTS

| | | | |
|---|---|---|---|
| 2,984,342 | 5/1961 | Smith | 428/349 |
| 3,783,783 | 1/1974 | Hamisch, Sr. | 156/277 |
| 4,574,817 | 3/1986 | Suzuki et al. | 131/94 |
| 4,707,211 | 11/1987 | Shibata | 156/354 |
| 5,095,920 | 3/1992 | Mattei | 131/117 |
| 5,560,293 | 10/1996 | Boreali et al. | 400/621 |

FOREIGN PATENT DOCUMENTS

| | | | |
|---|---|---|---|
| 57-110479 | 7/1982 | Japan | 400/621 |

*Primary Examiner*—David A. Wiecking
*Attorney, Agent, or Firm*—Joan H. Pauly; Donald A. Streck

[57] ABSTRACT

This invention relates to printers for printing on and cutting linerless, adhesive-backed, strip media. Described and claimed are methods and apparatus related to—(1) bridges for bridging a platen roller to minimize its exposed surface to the adhesive, (2) a printing station wherein the printhead moves over stationary media, (3) media having non-activated adhesive and a printer which activates the adhesive only after printing on and cutting the media, and (4) media having the adhesive in strips with non-adhesive gaps between and a cutting or tearing station for separating finished labels at the gaps.

12 Claims, 8 Drawing Sheets

LINERLESS MEDIA AND CUTTING APPARATUS FOR MINIMIZING ADHESIVE PROBLEMS WHEN CUTTING THE MEDIA

BACKGROUND OF THE INVENTION

The present invention relates to printers for printing on and separating linerless, adhesive-backed, strip media into finished labels and, more particularly, to (1) bridges for bridging a platen roller to minimize its exposed surface to the adhesive, (2) a printing station wherein the printhead moves over stationary media, (3) media having non-activated adhesive and a printer which activates the adhesive only after printing on and cutting the media, and (4) media having the adhesive in strips with non-adhesive gaps between and a cutting or tearing station for separating finished labels at the gaps.

Label printers for printing on strip media and then cutting or tearing it into individual finished labels is well established and known in the art. As depicted in FIG. 1, in one approach there is a printhead 10 disposed above the media 12 as it moves across and is supported by a platen surface 14. In another approach as depicted in FIG. 2, the platen surface 14 is replaced by a rotating platen roller 16. In the printing and subsequent cutting of labels employing media 12 without any backing or with an adhesive backing having a removable liner over the adhesive, the approaches of FIGS. 1 and 2 and virtually any known cutting apparatus would work without problem.

More recently, so-called "linerless" media such as that labeled as 18 in FIG. 3 has become popular for various reasons. The linerless media 18 has exposed adhesive 20 on its back surface. That way, labels when printed, cut, and dispensed, can be applied directly to a surface of interest. This is of particular benefit in commercial labeling machines where the liner material previously used becomes a waste problem to be contended with.

If the conventional prior art linerless media 18 of FIG. 3 is loaded into a conventional prior art label printer such as those of FIGS. 1 and 2, the adhesive 20 quickly sticks to all the parts and brings the operation of the printer to a halt—either immediately or in short order.

Various techniques have been tried to eliminate this problem. Some parts can be made from materials, such as the material polytetrafluorethylene, sold under the trademark Teflon, which do not readily adhere to the adhesive. The printing station and the cutting station, however, still require special consideration. If the adhesive-backed media 18 is to be supported under the printhead, it must be in a way that does not result in the adhesive 20 adhering to the support or transferring to the support resulting in adhesive build-up. At the cutting station, the problem of sticking and/or adhesive transfer and build-up is even more pronounced because the media and adhesive must be physically cut and separated.

Wherefore, it is an object of this invention to provide a way in which to modify existing label printer print stations to avoid the sticking or adhesive transfer problems normally associated with the use of linerless media therein.

It is another object of this invention to provide a new approach to a label printer print station which avoids the sticking or adhesive transfer problems normally associated with printing on linerless media.

It is still another object of this invention to provide a new linerless media which can be printed on and cut in a conventional label printer without the sticking or adhesive transfer problems normally associated with the use of linerless media therein; but, without the loss of benefits of linerless media along with a printer for use therewith.

It is yet another object of this invention to provide a modified linerless media which can be cut without the sticking or adhesive transfer problems normally associated with the use of linerless media.

Other objects and benefits of this invention will become apparent from the description which follows hereinafter when read in conjunction with the drawing figures which accompany it.

SUMMARY

The foregoing objects have been achieved by the following aspects of the present invention.

In a print station for printing on linerless media having a front surface for printing upon and a back surface with adhesive on it wherein a printhead is positioned over the front surface and a platen roller is positioned over the adhesive opposite the printhead, the apparatus for preventing the adhesive from sticking to the platen roller comprising a pair of bridge members disposed on opposite sides of an area of the platen roller contacting the adhesive to support the media and positioned to have adjacent ends thereof expose only a narrow area of the platen roller (which may be made of a non-stick material or have a non-stick surface coating) directly under a printing position line of the printhead to the adhesive.

Preferably, the adjacent ends of the bridge members are curved to fit close adjacent a supporting outer periphery of the platen roller. And, the bridge members are made of a material which resists adherence by the adhesive or the bridge members have surfaces contacting the adhesive which resist adherence by the adhesive. Both the pair of bridge members may be symmetrically positioned with respect to the platen roller. Alternatively, the supply side one of the pair of bridge members may be higher or lower than the other one of the pair of bridge members with respect to the narrow area of the platen roller.

In another embodiment, the invention is also directed to a printing station for printing on linerless media having a front surface for printing upon and a back surface with adhesive on it with reduced opportunity for sticking and/or transfer of the adhesive comprising, a platen bed disposed under the adhesive and extending over length and width of a printing area, the platen bed having a surface of a plurality of minimal contact areas in contact with the adhesive; a printhead disposed over the front surface and movable over the length of the printing area; and, means for moving the printhead over the front surface to print on the front surface while the media remains stationary. The means for moving the printhead over the front surface according to one approach comprises a track carrying the printhead for longitudinal movement over the media and means for moving the printhead along the track.

In a preferred approach to this embodiment, the platen bed has a plurality of projections having minimum contact area ends forming the surface. The platen bed may be movable between a raised position with the surface contacting the adhesive and a lowered position with the surface spaced from the adhesive.

The invention also includes a method for printing on linerless media having a front surface for printing upon and a back surface with adhesive on it with reduced opportunity for sticking and/or transfer of the adhesive comprising the steps of, positioning the media on a platen bed having a surface of a plurality of minimal contact areas disposed under the adhesive and extending over length and width of a printing area; positioning a printhead movable over the length of the printing area over the front surface; and, moving the printhead over the front surface while printing on the front surface and while keeping the media stationary.

Before the step of moving the printhead over the front surface while printing on the front surface the method may additionally comprise the steps of, moving the platen bed to a lowered position with the surface spaced from the adhesive; moving the media into position over the platen bed; and, moving the platen bed to a raised position with the surface contacting the adhesive. After the step of moving the printhead over the front surface while printing on the front surface the method may additionally comprise the steps of moving the platen bed to a lowered position with the surface spaced from the adhesive and removing the media from a position over the platen bed.

The invention also includes a linerless media for printing and cutting in a printer having no provision for handling tacky adhesives comprising a media strip having a front surface for printing upon and a back surface for carrying an adhesive and an unactivated non-tacky adhesive disposed on the back surface; and, a printer for the media comprising, a printing station for printing on the front surface; a cutting station for cutting the media strip; and, an activation station including activation means for activating the unactivated non-tacky adhesive whereby the adhesive is made tacky for use.

Another linerless media of the invention having a front surface for printing upon and a back surface with adhesive on it with reduced opportunity for sticking and/or transfer of the adhesive during cutting or tearing comprises a media strip having a front surface for printing upon and a back surface for carrying an adhesive and an activated tacky adhesive disposed on the back surface in a plurality of equal width areas separated by a plurality of equal width gaps containing no adhesive. Preferably, there are sensible indicia associated with each of the plurality of equal width gaps or, alternatively, with the desired length of the label of the particular application. Also preferably, the plurality of equal width areas containing adhesive are sufficiently narrow that more than one of the plurality of equal width areas is contained in a label cut from between two of the plurality of equal width gaps whereby labels of different lengths can be cut from the linerless media.

There is a cutting station for the latter media comprising, a first cutter member sized to fit within a selected one of the plurality of gaps to support the strip media and a second cutter member disposed to interact with the first cutter member to cut the strip media along a centerline of the selected one of the plurality of gaps. Where there are the sensible indicia on the media, the cutting station also includes a sensing station for sensing the sensible indicia whereby to synchronize position of the first cutter member with the selected one of the plurality of gaps.

DESCRIPTION OF THE PREFERRED EMBODIMENT

Figure 3:
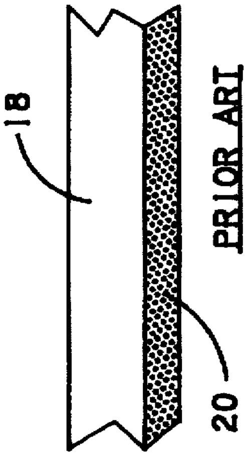
PRIOR ART FIG. 3
FIG. 3 is a simplified cutaway drawing through a "linerless" media having adhesive on its back surface.

The foregoing objects of the present invention have been achieved by several embodiments as shown in the drawing figures and now to be described in detail.

Figure 4:
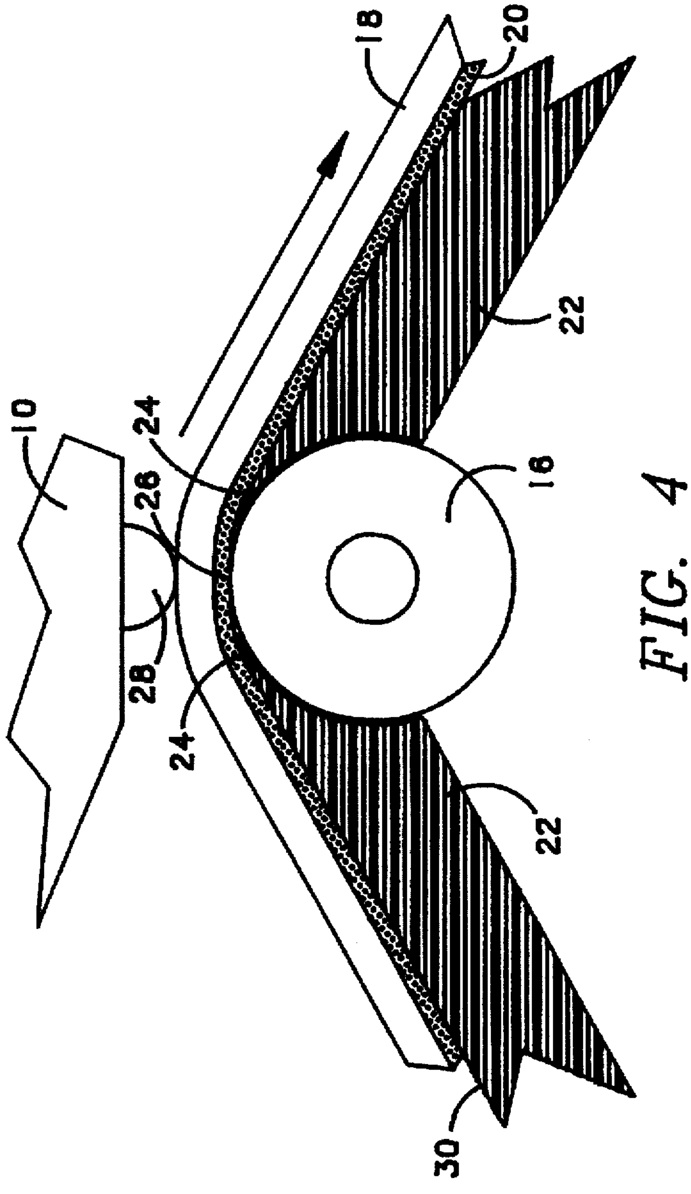
FIG. 4 is an enlarged, partially cutaway drawing of a printing station for printing on linerless media according to a first variation of a first embodiment of the present invention.

A first approach to adapting a conventional print station to print on linerless media is shown in FIG. 4. In this approach, a pair of platen roller guards 22 are positioned as shown with bridge elements 24 extending over the platen roller 16 on each side so as to leave only a small exposed portion 26 directly under the printing elements 28 of the printhead 10. The platen roller guards 22 are made of a non-sticking material with respect to the adhesive 20 or, in the alternative, have a top surface 30 to which the adhesive 20 does not stick. Polytetrafluorethylene (sold under the trademark Teflon) is a well known material that can be used for the guards 22 in total or as a lining material for the top surface 30. Alternatively, the top surface 30 could be plasma coated with an appropriate non-sticking material of a type known to those of ordinary skill in the art and/or made of a patterned material as for example, a knurled surface. If desired or helpful, the opposite end of the roller guard 22 on the supply side end of the platen roller 16 could be provided with a knife edge to assist in separating the media 12 from its supply roll. To assist in the adhesive 20 not sticking to the platen roller 16 within the limited exposed portion, it is preferred that the platen roller 16 also be made of or have an outer surface of a non-stick or sticking resistant material.

Figure 5:
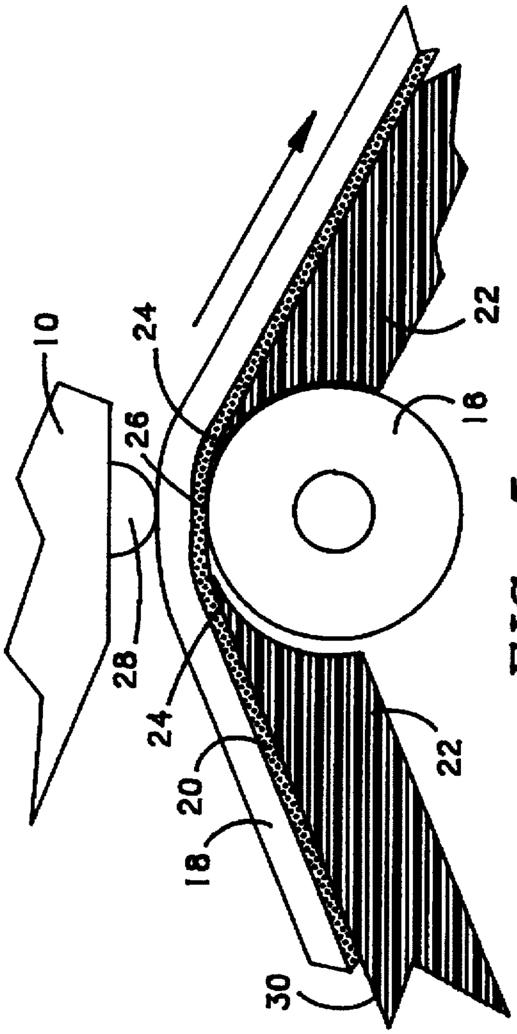
FIG. 5 is an enlarged, partially cutaway drawing of a printing station for printing on linerless media according to a second variation of a first embodiment of the present invention.
Figure 6:
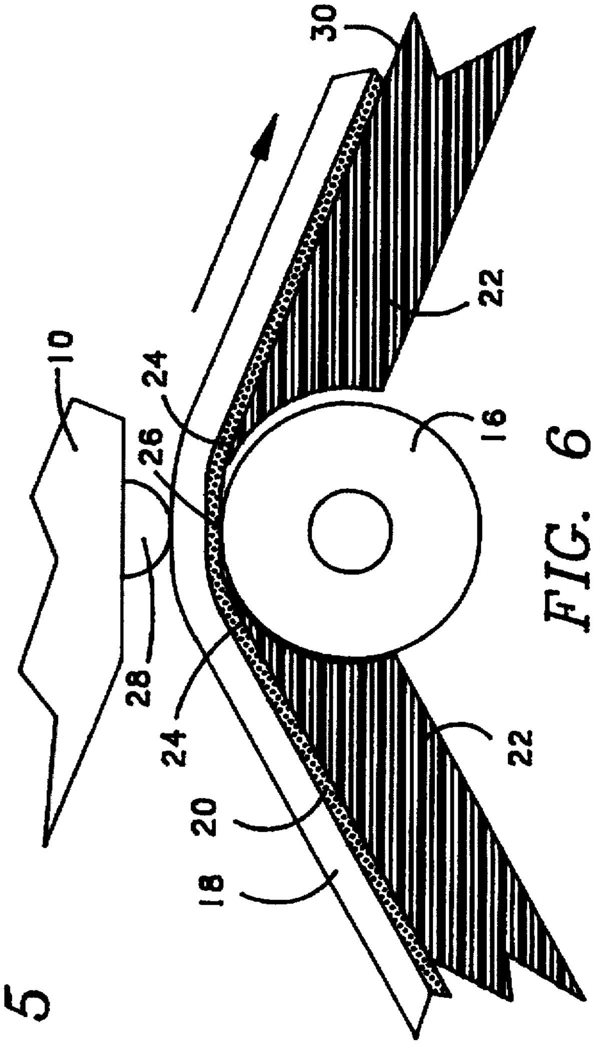
FIG. 6 is an enlarged, partially cutaway drawing of a printing station for printing on linerless media according to a third variation of a first embodiment of the present invention.

Under certain circumstances and conditions as existing in a particular implementation with the materials employed for the components, it may provide better results relative to non-sticking to have the supply side guard 22 higher as depicted in FIG. 5 or to have the supply side guard 22 lower as depicted in FIG. 6 rather than have them symmetrical about the platen roller 16 as depicted in FIG. 4 and as described in detail above. This is easily established in a test bed environment employing the components of interest to see which orientation provides the best results.

Figure 2:
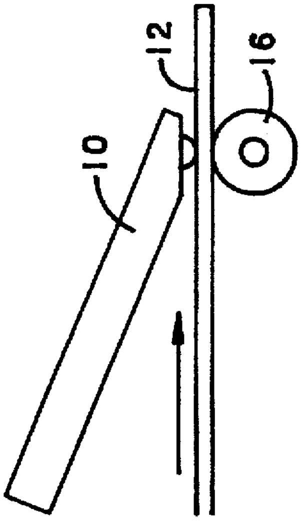
FIG. 2 PRIOR ART
FIG. 2 is a simplified drawing of a prior art printer printing on strip media without adhesive on its back surface employing a rotating platen roller.
Figure 1:
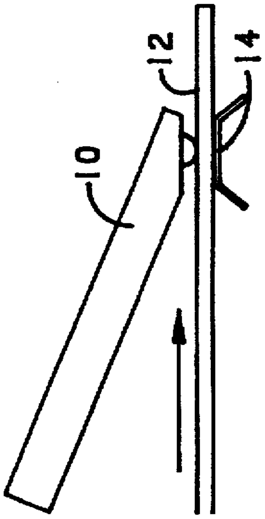
FIG. 1 PRIOR ART
FIG. 1 is a simplified drawing of a prior art printer printing on strip media without adhesive on its back surface employing a non-rotating platen.
Figure 7:
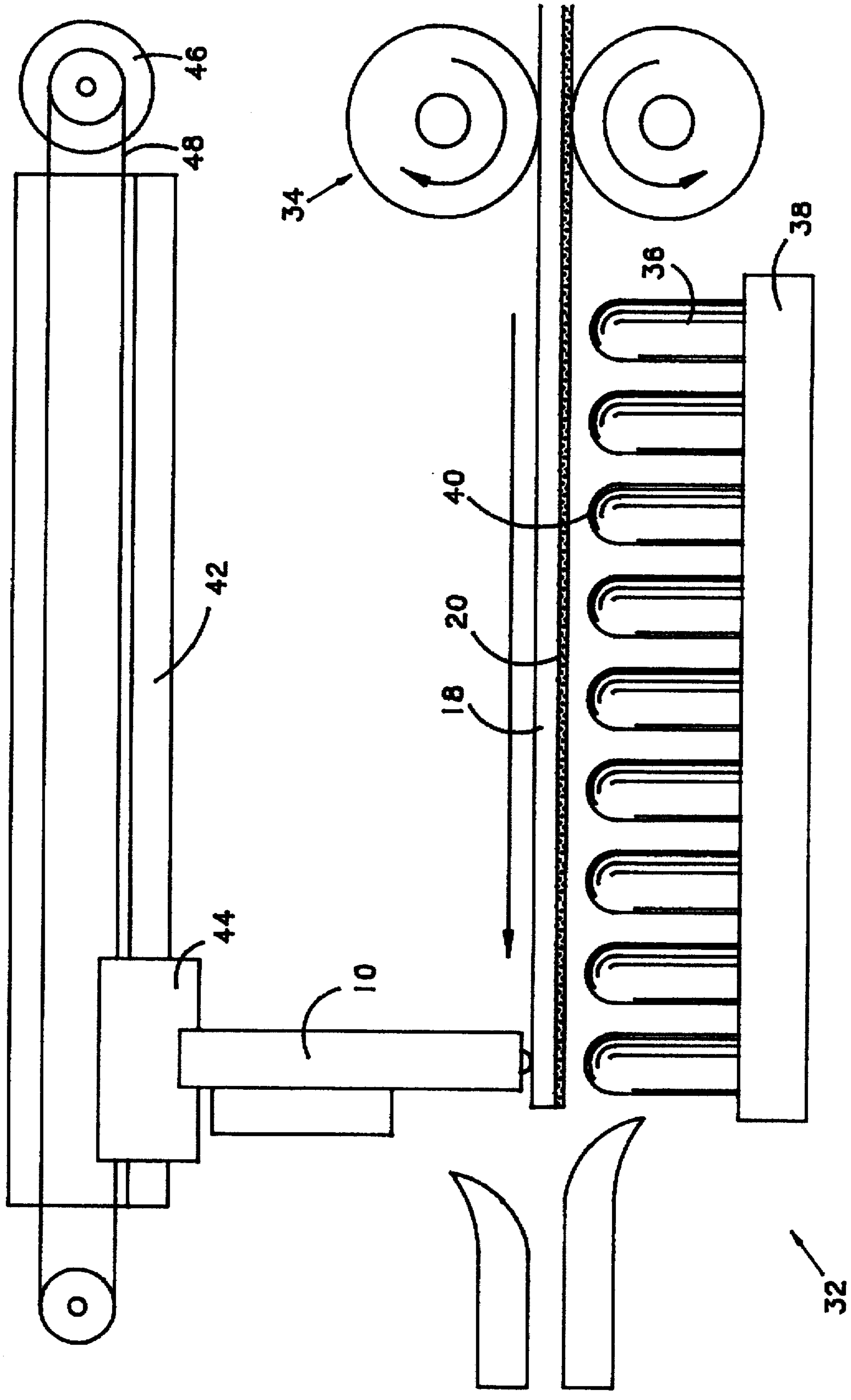
FIGS. 7, 8, 9 and 10 are enlarged, partially cutaway drawings showing the operation of a printing station for printing on linerless media according to a second embodiment of the present invention.
Figure 8:
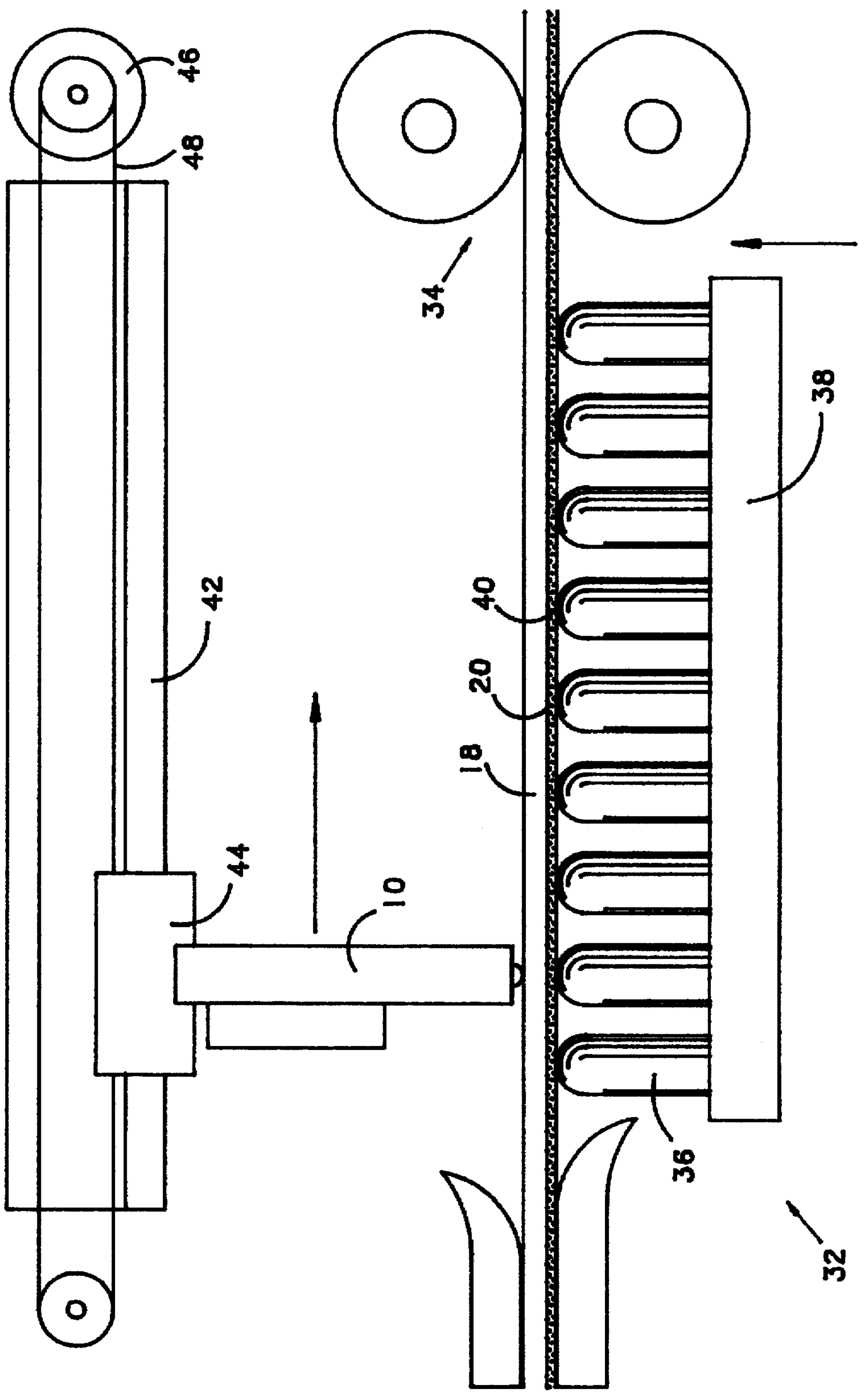
Figure 9:
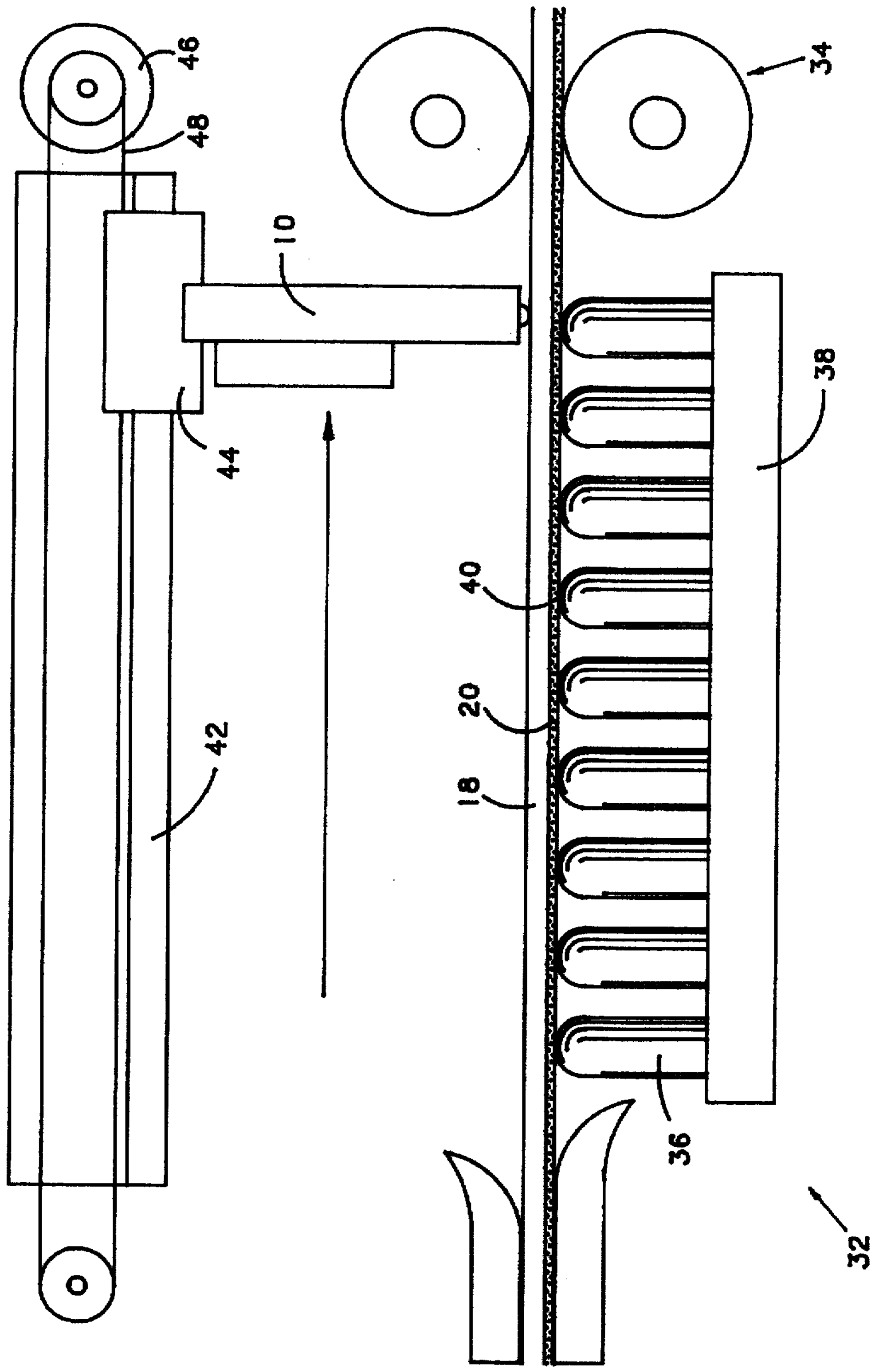
Figure 10:
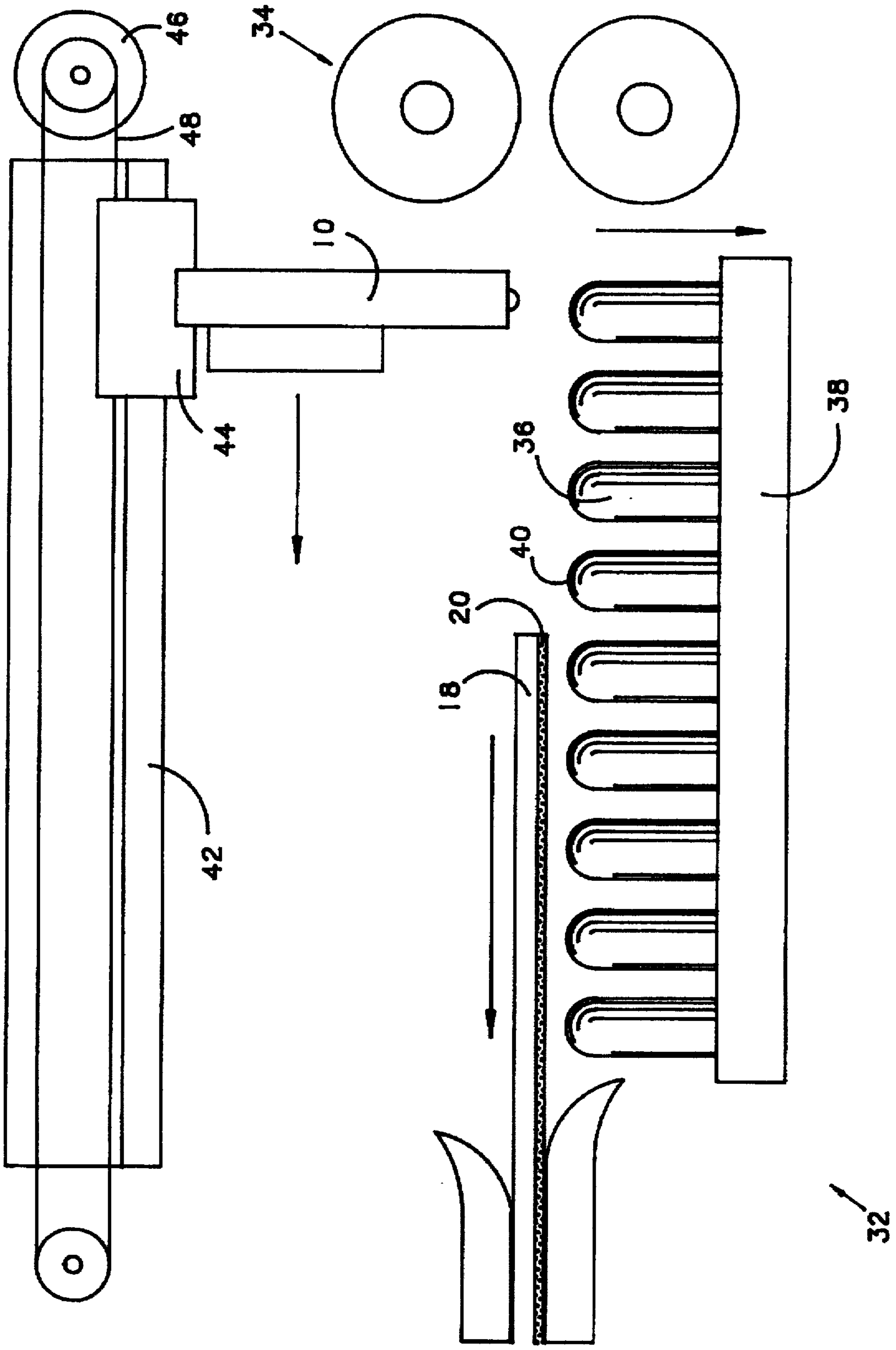

An entirely new approach to a printing station for printing on linerless media is shown in FIGS. 7 through 10 where it is generally labeled as 32. In the typical prior art printer, the printing station is as depicted in FIGS. 1 and 2 where the printhead 10 is fixed opposite a platen element 14, 16 and the media 12 moves through the station for printing. In the printing station 32 of this invention, the linerless media 18 moves into the printing station 32, stops and is supported in a manner which is not conducive to adhesive transfer or sticking, and then the printhead 10 is moved over the stationary media 18. As shown in the preferred embodiment of FIGS. 7–10 and FIG. 7 in particular, the linerless media 18 is moved into the printing station 32 by the drive roller pair 34. The "platen" comprises a plurality of vertical projections 36 carried by the base 38. The projections 36 have tops 40 which provide a minimum contact area with the adhesive 20. Preferably, they are also made of or at least topped with a material, texture, or coating which further resists the adhesive 20 adhering or transferring thereto. In the embodiment as shown, the base 38 moves between a lowered position as shown in FIGS. 7 and 10 and a raised position as shown in FIGS. 8 and 9. This feature further assures that the adhesive 20 will not adhere to the tops 40; but, it can be omitted if desired in a less complex mechanism without undue probability of adhesive adherence.

The printhead 10 is carried on a track 42 by the member 44 and the member is movable along the track 42 by the motor 46 through the connecting wire 48. Other motive approaches such as a screw drive could, of course, be employed. The printhead 10 could even be manually moved in a very simple printer within the scope and spirit of the present invention.

In any event, the media 18 is first moved into the printing station 32 as depicted in FIG. 7. As depicted in FIGS. 8 and 9, the platen projections 36 are raised to support the stationary media 18 and the printhead 10 is moved over the media 18 to print on it. After printing, the projections 36 are lowered, the media 18 is withdrawn from the printing station 32, and the printhead 10 is returned to its starting position as depicted in FIG. 10. It should be noted that the printing station 32 could also print bi-directionally if desired. In that case, the printhead 10 would remain at one end or the other and then print in the opposite direction for the next label.

Figure 11:
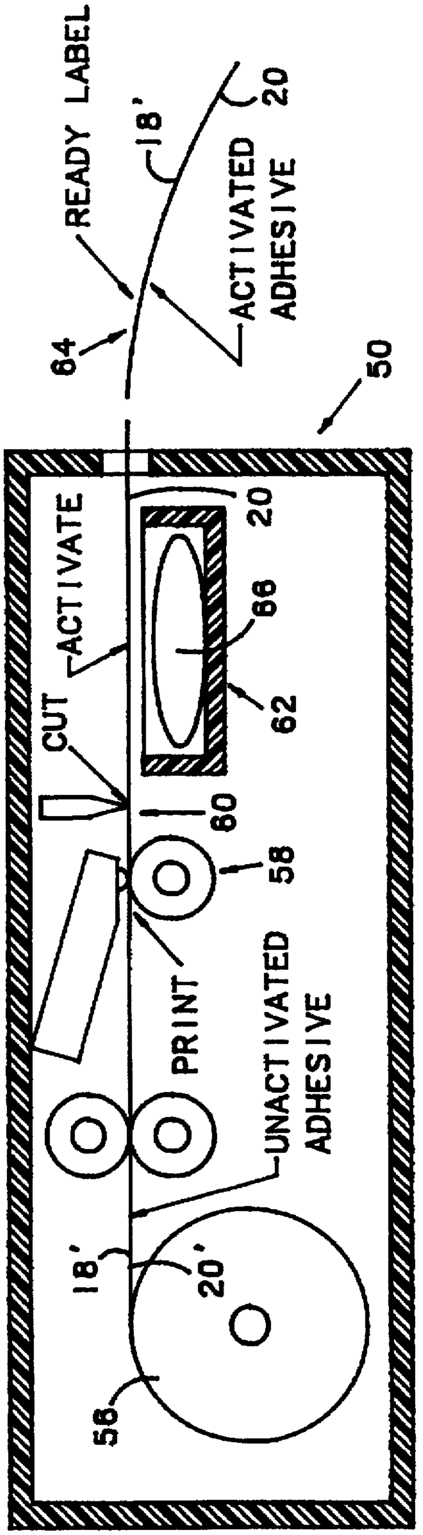
FIG. 11 is a simplified cutaway drawing of a printer for printing on and then cutting linerless media according to a third embodiment of the present invention.

Another approach to solving the adhesive problem of linerless media is depicted in FIG. 11. In this case, the printer 50 is of substantially conventional design except for the addition of an activation station 62 at the end of the printing and cutting process. It is a change in the linerless media 18' which makes this possible. As opposed to prior art linerless media in which the adhesive is in its tacky state on the supply roll, the linerless media 18' of this embodiment of the present invention has non-tacky adhesive 20' as supplied. Thus, in the printer 50 of FIG. 11, the roll 56 of media 18' does not require a release coating on the printing surface or otherwise since the adhesive 20' has no adhesive qualities. Similarly, the printing station 58 and the cutting station 60 are of conventional prior art design without any provision for handling active adhesive. Following the cutting station 60, however, there is an activation station 62 over which (or through which) the media 18' passes to activate the adhesive 20' to its tacky state, indicated by 20. The printed and cut label 64 with adhesive 20 ready for use is what is dispensed by the printer 50. The linerless media 18' and its adhesive 20' can be implemented by any of several materials commercially available and well known to those of ordinary skill in the adhesives art which, per se, form no part of the present invention. For example, there are commercially available adhesives which are activated by exposure to various kinds of light such as UV, or otherwise. In that case, the activation station 62 would contain a light source as the active element 66. There are other commercially available adhesives which are activated by exposure to a liquid such as water, solvent, or the like. In that case, the activation station 62 could comprise a spray or bath of the appropriate liquid.

Figure 12:
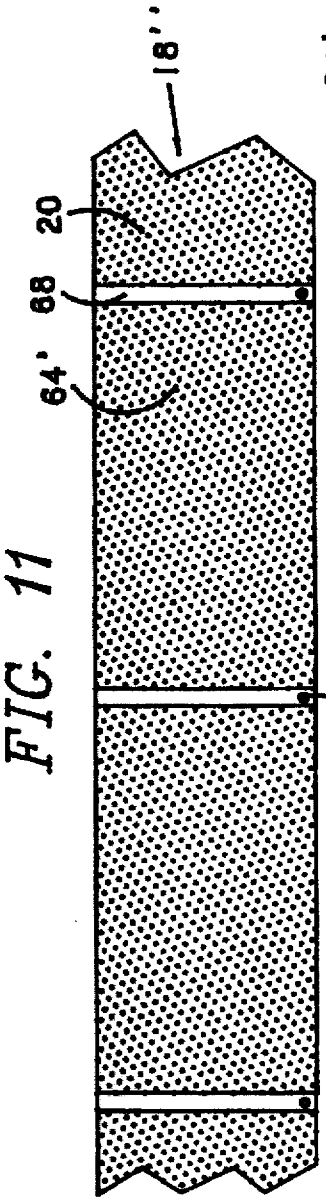
FIG. 12 is a drawing of linerless media according to a first variation of a fourth embodiment of the present invention.
Figure 13:
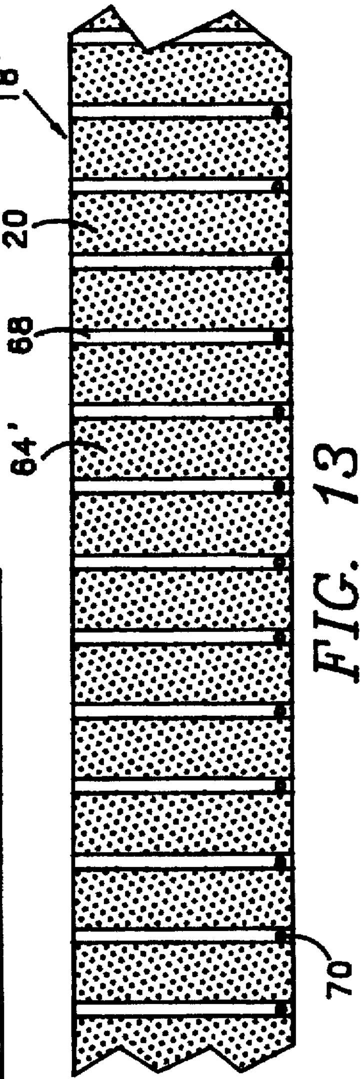
FIG. 13 is a drawing of linerless media according to a second variation of a fourth embodiment of the present invention.

An alternate approach to employing an activatable adhesive which can be handled without problem until affirmatively activated is depicted in FIGS. 12 through 15. This embodiment of the present invention is directed to the fact that the primary problem with prior art linerless media exists in the cutting. It is possible to move the linerless media with an active adhesive through a printer and print on it according to a number of techniques such as those described hereinbefore. Cutting through the adhesive, on the other hand, presents a more difficult problem. According to this embodiment of this invention, the adhesive 20 is employed in the usual manner with one provision—there are gaps of no adhesive at pre-established points of cutting. As shown in FIG. 12, the media 18" comprises a plurality of pre-established label areas 64' of adhesive 20 separated by gaps 68. Each gap 68, which represents the start of one label 64 and the end of the next adjacent label 64 is marked with a sensible indicia 70 such as a hole. The positional marking of continuous linerless media is addressed in a co-pending application entitled METHOD AND APPARATUS TO DETERMINE POSITION & SENSE MOTION OF LINERLESS MEDIA by Pixie Austin and Cathy Aragon, filed on May 4, 1995, as Ser. No. 08/435,024 and also assigned to the common assignee of this invention, the teachings of which are hereby incorporated herein by reference. Using any of the techniques described therein, the gaps 68 can be sensed and the media 18" can thereafter be longitudinally positioned for printing or cutting. In this case, the labels 64 are separated by cutting along the center line of the gaps 68. It is anticipated that the gaps will be in the order of ⅛th inch in width. Thus, when the labels 64 are cut from the media 18", there is only 1/16th of an inch on each end without adhesive. And, as mentioned below, it anticipated that when the label 64 is placed on a surface and pressed in place for maximum adherence, the adhesive 20 will bleed into these small remaining end half-gaps 68 and virtually eliminate them.

Figure 15:
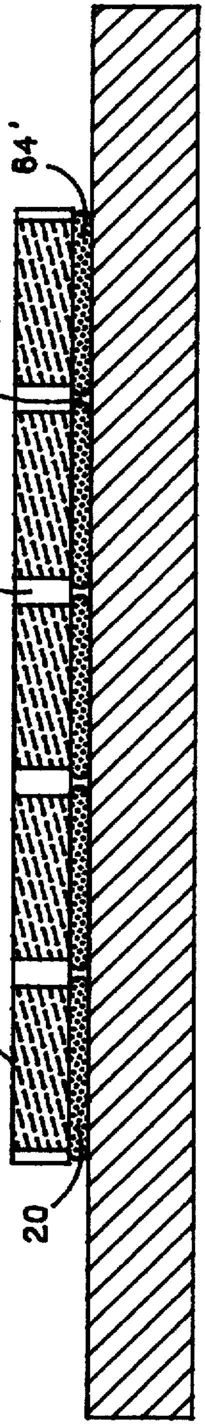
FIG. 15 is a simplified, cutaway drawing depicting how the adhesive in the linerless media of FIG. 13 spread to fill in the adhesiveless strips when a label from the media is attached to a surface and pressed in place.

In the case of the media 18" of FIG. 12, the label areas 64' of adhesive 20 are intended to cover an entire label 64 when cut. Thus, only one size label can be cut from the media 18" of FIG. 12. In the media 18" of FIG. 13, the label areas 64' are narrow. It is intended that each label 64 comprise several label areas 64'. Since the number is arbitrary, the labels 64 can be made of various pre-defined sizes dictated by the width of the label areas 64' and the number of label areas 64' between cuts. As depicted in FIG. 15, it is anticipated that the adhesive 20 will "bleed" into the gap areas 68 and virtually eliminate them when the label 64 is pressed onto a surface.

Figure 14:
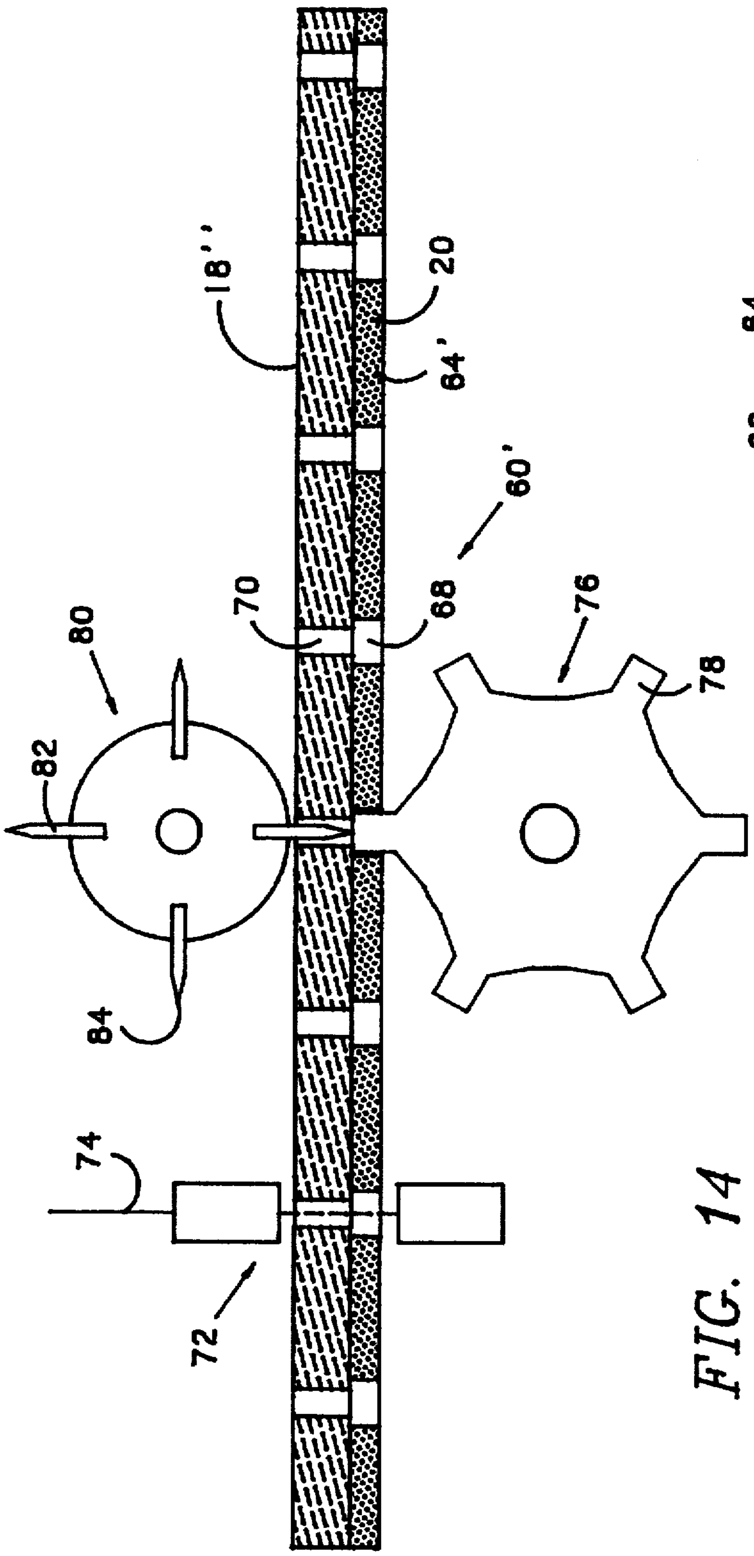
FIG. 14 is an enlarged, simplified, partially cutaway drawing of a cutting station according to the present invention for cutting the linerless media of FIGS. 12 and 13.

A cutting station 60' for use with the media 18" is depicted in FIG. 14. A sensing station 72 is provided to sense the indicia 70 and provide a signal on line 74 which is used to synchronize the components of the cutting station 60' to the gaps 68 for cutting. The cutting station 60' itself comprises an anvil wheel 76 having a plurality of gap-sized anvil projections 78 about its periphery. The anvil projections 78 are in number and radially spaced such that the anvil projections 78 will enter the gaps 68 in respective sequence as the media 18" moves and the anvil wheel 76 rotates in combination therewith. It should be noted in passing that the ends of the anvil projections 78 could be provided with small gripping projections that do not interfere with the cutting action so that the anvil wheel 76 could also be used to longitudinally drive the media 18" once the anvil projections 78 were engaged with the media 18" within the gaps 68. A rotatable cutting wheel 80 is disposed opposite the anvil wheel 76. Other cutting devices could, of course, be employed if desired. The rotatable cutting wheel 80 is shown by way of example as to one approach that could be employed. The cutting wheel 80 has a plurality of radially equally spaced rib members 82 with cutting ends 84 extending outward from the periphery thereof. A parked position exists between each pair of rib members 82. To move the media 18", the cutting wheel 80 is maintained in a parked position with the two closest rib members 82 above the media 18". To cut the media 18", the cutting wheel 80 is rotated from one parked position to the next parked position through the cutting position shown in FIG. 14 where the cutting end 84 of one rib member 82 arrives at the surface of the media 18" and passes therethrough to contact the top of an anvil projection within the adjacent gap 68. This timing is, of course, synchronized as a result of the signal provided by the sensing station 72. Any other type of cutting device interacting with the anvil wheel 76 would be similarly synchronized in its action. Thus, the media 18" is always cut along the center of a gap 68 and the cutting mechanism never contacts the adhesive 20 and, accordingly, is not fouled by it.

Wherefore, having thus described the present invention, what is claimed is:

1. A print station for printing on linerless adhesive-backed media and cutting said media into individual labels, comprising:

linerless media having a front surface for printing upon and a back surface with adhesive on it wherein a printhead is positioned over the front surface, said adhesive disposed on the back surface in a plurality of equal width areas separated by a plurality of equal width gaps containing no adhesive;

a platen roller positioned over the adhesive opposite the printhead, and including apparatus for preventing the adhesive from sticking to the platen roller;

a pair of bridge members disposed on opposite sides of an area of the platen roller for contacting the adhesive to support the media and positioned to have adjacent ends thereof expose only a narrow area of the platen roller directly under a printing position line of the printhead to the adhesive; and, a cutting station for cutting said linerless media including a first cutter member sized to fit within a selected one of the plurality of gaps to support the media; and, a second cutter member disposed to interact with said first cutter member to cut the media along a centerline of said selected one of the plurality of gaps.

2. The print station of claim 1, in which there are a plurality of said first cutter members; and which comprises an anvil wheel having a plurality of circumferentially spaced, radially extending projections, each said projection comprising one of said first cutter members, and said anvil wheel being mounted to rotate in synchronization with movement of the media through the cutting station such that successive ones of said projections enter successive ones of of said gaps.

3. A linerless media having a front surface for printing upon and a back surface with adhesive on it with reduced opportunity for sticking and/or transfer of the adhesive during cutting comprising:

a) a media strip having a front surface for printing upon and a back surface for carrying an adhesive; and b) an activated tacky adhesive disposed on said back surface in a plurality of equal width areas separated by a plurality of equal width gaps containing no adhesive;

wherein said plurality of equal width areas containing adhesive are sufficiently narrow that labels of different widths can be cut from said media strip by varying the number of said equal width areas contained in said labels.

4. The linerless media of claim 3 and additionally comprising:

sensible indicia positioned in each of said plurality of equal width gaps.

5. In combination:

the linerless media of claim 3; and a cutting station including a first cutter member sized to fit within a selected one of said gaps to support the media strip, and a second cutter member disposed opposite said first cutter member to cooperate therewith to cut the media strip along a mid portion of said selected one of said gaps.

6. The combination of claim 5, in which there are a plurality of said first cutter members; and which comprises an anvil wheel having a plurality of circumferentially spaced, radially extending projections, each said projection comprising one of said first cutter members, and said anvil wheel being mounted to rotate in synchronization with movement of the media strip through the cutting station such that successive ones of said projections enter successive ones of said gaps.

7. A linerless media having a front surface for printing upon and a back surface with adhesive on it with reduced opportunity for sticking and/or transfer of the adhesive during cutting comprising:

a) a media strip having a front surface for printing upon and back surface for carrying an adhesive; and, b) an activated tacky adhesive disposed on said back surface in a plurality of equal width areas separated by a plurality of equal width gaps containing no adhesive; said gaps being positioned to have mid portions thereof coincide with points of cutting the media strip into individual labels; and said gaps having a width that is sufficiently small and said adhesive being of a type that is sufficiently fluid to allow said adhesive to bleed into said gaps, when pressure is applied to one of said labels to secure said label to a surface, and at least substantially fill portions of said gaps adjacent to a cut edge of said label.

8. The linerless media of claim 7 and additionally comprising:

sensible indicia positioned in each of said plurality of equal width gaps.

9. In combination:

the linerless media of claim 7; and a cutting station including a first cutter member sized to fit within a selected one of said gaps to support the media strip, and a second cutter member disposed opposite said first cutter member to cooperate therewith to cut the media strip along a mid portion of said selected one of said gaps.

10. The linerless media of claim 7, wherein said plurality of equal width areas containing adhesive are sufficiently narrow that labels of different widths can be cut from the linerless media by varying the number of said equal width areas contained in said labels.

11. In combination:

the linerless media of claim 10; and a cutting station including a first cutter member sized to fit within a selected one of said gaps to support the media strip, and a second cutter member disposed opposite said first cutter member to cooperate therewith to cut the media strip along a mid portion of said selected one of said gaps.

12. The combination of claim 11, in which there are a plurality of said first cutter members; and which comprises an anvil wheel having a plurality of circumferentially spaced, radially extending projections, each said projection comprising one of said first cutter members, and said anvil wheel being mounted to rotate in synchronization with movement of the media strip through the cutting station such that successive ones of said projections enter successive ones of said gaps.

* * * * *